United States Patent
Branover

(10) Patent No.: US 12,405,894 B2
(45) Date of Patent: Sep. 2, 2025

(54) RUNTIME FLUSHING TO PERSISTENCY IN HETEROGENOUS SYSTEMS

(71) Applicant: Advanced Micro Devices, Inc., Santa Clara, CA (US)

(72) Inventor: Alexander Joseph Branover, Chestnut Hill, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/957,262

(22) Filed: Sep. 30, 2022

(65) Prior Publication Data

US 2024/0111682 A1 Apr. 4, 2024

(51) Int. Cl.
G06F 12/00 (2006.01)
G06F 12/0891 (2016.01)
G06F 12/0804 (2016.01)
G06F 12/0868 (2016.01)

(52) U.S. Cl.
CPC ...... G06F 12/0891 (2013.01); *G06F 12/0804* (2013.01); *G06F 12/0868* (2013.01)

(58) Field of Classification Search
None
See application file for complete search history.

(56) References Cited

U.S. PATENT DOCUMENTS

| | | |
|---|---|---|
| 9,632,711 B1 | 4/2017 | Obr |
| 11,455,251 B2 | 9/2022 | Branover et al. |
| 11,966,339 B1 | 4/2024 | Branover |
| 2003/0084248 A1 | 5/2003 | Gaither et al. |
| 2015/0089121 A1* | 3/2015 | Coudhury ........... G06F 12/0804 711/103 |
| 2015/0268711 A1 | 9/2015 | Ramani et al. |
| 2016/0357669 A1 | 12/2016 | Greenhalgh |
| 2016/0378660 A1 | 12/2016 | Gendler et al. |
| 2016/0378701 A1 | 12/2016 | Niell et al. |
| 2017/0038999 A1 | 2/2017 | Vanka et al. |
| 2018/0032439 A1* | 2/2018 | Jenne ................. G06F 12/0804 |
| 2018/0150220 A1 | 5/2018 | Pandian et al. |
| 2020/0192798 A1 | 6/2020 | Natu |
| 2021/0026800 A1* | 1/2021 | Hahn .................... G06F 3/0619 |
| 2021/0141433 A1 | 5/2021 | Watt |
| 2022/0147455 A1 | 5/2022 | Branover et al. |

(Continued)

FOREIGN PATENT DOCUMENTS

| | | |
|---|---|---|
| WO | 2024073193 A1 | 4/2024 |
| WO | 2024073197 A1 | 4/2024 |

OTHER PUBLICATIONS

U.S. Appl. No. 17/957,205, "Notice of Allowance", U.S. Appl. No. 17/957,205, filed Dec. 19, 2023, 8 pages.

(Continued)

*Primary Examiner* — Midys Rojas
(74) *Attorney, Agent, or Firm* — FIG. 1 Patents

(57) ABSTRACT

Runtime flushing to persistency in heterogenous systems is described. In accordance with the described techniques, a system may include a persistent memory in electronic communication with at least one cache and a controller configured to command the at least one cache to flush dirty data to the persistent memory in response to a dirtiness of the at least one cache reaching a cache dirtiness threshold.

20 Claims, 6 Drawing Sheets

(56) References Cited

U.S. PATENT DOCUMENTS

2024/0111680 A1  4/2024  Branover

OTHER PUBLICATIONS

PCT/US2023/072458 , "International Seach Report and Written Opinion", PCT Application No. PCT/ US2023/072458, Dec. 5, 2023, 8 pages.

PCT/US2023/072655 , "International Seach Report and Written Opinion", PCT Application No. PCT/US2023/072655, Dec. 11, 2023, 8 pages.

* cited by examiner

RUNTIME FLUSHING TO PERSISTENCY IN HETEROGENOUS SYSTEMS

BACKGROUND

Computer systems are susceptible to occasional events that cause them to be temporarily shut down or powered off. For example, a computer system may lose electrical power due to a power outage or another disruption in the power supply. As another example, the computer system may be manually reset by a user in response to an application program or operating system issue that "locks up" the computer system. Occasionally, such computer shutdowns can be anticipated so that data can be preserved before the shutdown. However, any data that was modified but not yet saved in persistent memory (e.g., nonvolatile memory, battery backed-up memory, a hard disk drive, etc.) will be lost due to the loss of power or reset.

DETAILED DESCRIPTION

Overview

Figure 1:
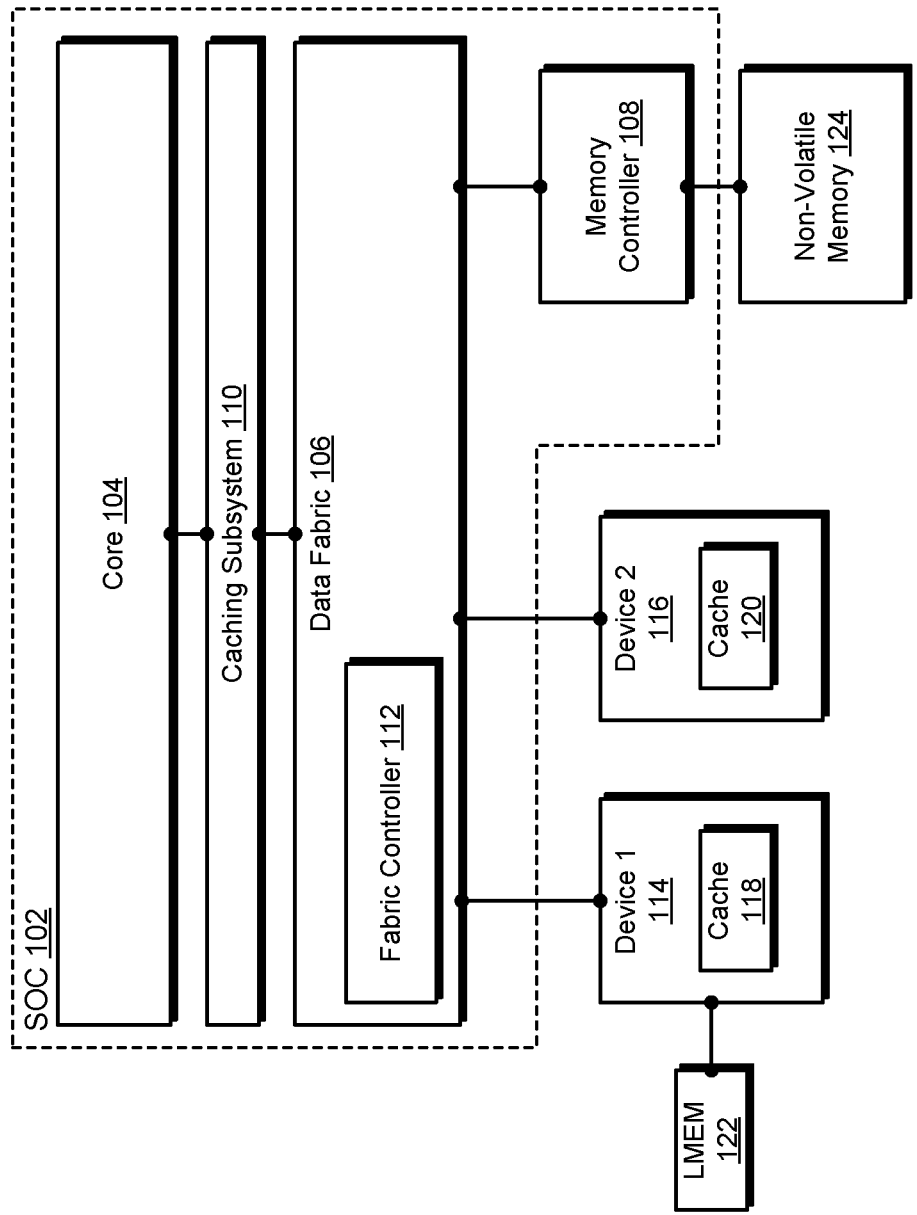
FIG. 1 is a block diagram of a non-limiting example data processing system having a system-on-chip (SOC).

Caches enable data processors to quickly access frequently used data. Data stored within a cache may be written over, such as when an application modifies the data. Generally, such written over (e.g., modified) data is marked as "dirty," and the modified dirty data may be written back to persistent memory during a "flush" event.

A flush event can be initiated in a variety of different ways, such as via a firmware command or a software command. There are various reasons for initiating the runtime flushing of data from caches, buffers, and queues to persistence. A terminal flush event trigger includes an imminent power loss or hazardous reset, while a non-terminal flush event trigger includes a software-initiated push to persistence, e.g., to flush data for consumption by other processes or to save sensitive data on a periodic basis. Data loss occurs in such systems when there is not an adequate amount of time to push data from the caches and other structures (e.g., buffers and queues) to persistent memory before the terminal event (e.g., a power loss) occurs.

Furthermore, if a data processing system implements multiple processors, and data is exchanged between the multiple processors using distributed memory that forms one memory pool, then each of the processors flushes their caches and forces serialization between different application threads to ensure a reliable backup and restore point. However, this may cause a substantial disruption in software operation. Moreover, in larger, more complex systems, such as systems-on-chip (SOCs) with complex data fabrics for communication between different processing elements, a request for flushing the cache of one device may not propagate to all of the devices sharing data (e.g., within a coherent domain). Thus, it may be difficult to ensure data visibility and durability in these complex systems.

To overcome these problems, runtime flushing to persistency in heterogenous systems based on runtime events is described. In accordance with the described techniques, a fabric controller receives a flush event trigger and commands one or more devices with a caching subsystem and data associated with persistent memory or global observability to flush to persistency. In at least one variation, for instance, all of the devices that are in a same coherent domain and share data are flushed together. In at least one other variation, fewer than all of the devices that are in a same coherent domain and share data are flushed together. The fabric controller then verifies that the data is properly flushed to the persistent memory.

The flush event trigger is either a terminal flush event trigger or a non-terminal flush event trigger. As described above, a terminal flush event trigger typically includes a power loss or hazardous reset that results in power cycling the computer system. In contrast, a non-terminal flush event trigger does not result in power cycling the computer system, and the computer system remains powered on.

In accordance with the described techniques, in some examples, a device electronically coupled to the data fabric initiates the non-terminal flush event trigger in order to make room in its cache, preserve sensitive data, and/or make the modified, dirty data held in its cache globally observable. Thus, in response to the fabric controller receiving the non-terminal flush event trigger initiated by the device, one or more devices within the coherent domain flush their dirty data to persistence (and not just the initiating device). In this way, performance is increased by ensuring that updated data is globally available.

In another example, the non-terminal flush event trigger is initiated by hardware, firmware, or a combination of both in response to reaching an operational point that is determined based on current system conditions, including power and thermal conditions. Notably, a latency for pushing the dirty data to persistency increases as a dirtiness of the cache increases. Furthermore, an amount of energy consumed by pushing the dirty data to persistency increases as the dirtiness of the cache increases. As such, the operational point indicates the system conditions at which a non-terminal flush event trigger is generated in order to pre-emptively push the data to persistency before a predicted latency (e.g., predicted based on the dirtiness of the cache) exceeds an available latency that is determined based on the current system conditions. In examples, the operational point is a cache dirtiness threshold that varies based on the system conditions, and the non-terminal flush event trigger is generated in response to the dirtiness of the cache reaching the cache dirtiness threshold. By maintaining the predicted latency below the available latency, a risk of data loss during a terminal event is decreased.

The techniques described herein provide a highly controllable runtime decision to flush caches to persistency that does not require modifications to application programs or high-level software. Furthermore, the runtime decision is executable in a heterogenous compute system. By ensuring that outstanding data is flushed from devices (e.g., every device) associated with the same domain, an increased shareability between resources (e.g., the memory) is enabled, thus reducing costs. In at least one variation, for instance, multiple different types of devices are attached to the data fabric, and any device attached to the data fabric may initiate the flush. This approach ensures that the other devices attached to the data fabric are notified in order to cache data associated with the initiating device. In this way, a quality of service across domains is improved by ensuring that updated data is reliably available.

A technical effect of pre-emptively executing a global push to persistence in a heterogenous compute system in response to reaching an operational point that is determined based on system conditions is that data loss during a terminal event, such as a power loss, is reduced while an efficiency of resource sharing is increased.

In some aspects, the techniques described herein relate to a system including: a persistent memory in electronic communication with at least one cache; and a controller configured to: command the at least one cache to flush dirty data to the persistent memory in response to a dirtiness of the at least one cache reaching a cache dirtiness threshold.

In some aspects, the techniques described herein relate to a system, wherein to command the at least one cache to flush the dirty data to the persistent memory in response to the dirtiness of the at least one cache reaching the cache dirtiness threshold, the controller is further configured to: determine an available latency for flushing the dirty data of the at least one cache to the persistent memory based on operating conditions of the system; and set the cache dirtiness threshold to be a cache dirtiness having a predicted flushing latency that is no greater than the available latency.

In some aspects, the techniques described herein relate to a system, wherein the system further includes a processor, and wherein the operating conditions include a thermal state of the processor and a power state of the processor.

In some aspects, the techniques described herein relate to a system, wherein the processor is included in a system-on-chip (SOC) and includes a first cache of the at least one cache, and wherein the persistent memory is in electronic communication with the first cache through a data fabric.

In some aspects, the techniques described herein relate to a system, further including an external device coupled to the data fabric, the external device having a second cache of the at least one cache.

In some aspects, the techniques described herein relate to a system, wherein the external device is one of an accelerator, a parallel accelerated processor, an accelerator with memory, a caching device, and a graphics processing unit, and wherein the controller is further configured to: command the at least one cache to flush dirty data to the persistent memory in response to receiving a flush event initiation from the external device.

In some aspects, the techniques described herein relate to a system, wherein the cache dirtiness threshold varies based on operating conditions of the system.

In some aspects, the techniques described herein relate to a system, wherein the persistent memory is in electronic communication with the at least one cache through a data fabric, and wherein to command the at least one cache to flush the dirty data to the persistent memory in response to the dirtiness of the at least one cache reaching the cache dirtiness threshold, the controller is further configured to: transmit a flush command signal to the at least one cache that causes the at least one cache to send write requests for cache lines that contain the dirty data to the data fabric, the write requests including in-flight data in the data fabric; and push the in-flight data from the data fabric to the persistent memory.

In some aspects, the techniques described herein relate to an apparatus, including: a data processing system having at least one cache, a persistent memory, and a controller configured to: select a threshold for flushing the at least one cache to the persistent memory based on an available latency for flushing the at least one cache, and command the at least one cache to flush to the persistent memory in response to reaching the threshold.

In some aspects, the techniques described herein relate to an apparatus, wherein to select the threshold for flushing the at least one cache to the persistent memory based on the available latency, the controller is further configured to: determine the available latency based on conditions of the data processing system, and set the threshold as a cache dirtiness having a predicted latency that is no greater than the available latency.

In some aspects, the techniques described herein relate to an apparatus, wherein the conditions of the data processing system include thermal and power operating conditions of the data processing system.

In some aspects, the techniques described herein relate to an apparatus, further including a data fabric electrically coupling the at least one cache to the persistent memory, and wherein to command the at least one cache to flush to the persistent memory in response to reaching the threshold, the controller is further configured to: command the at least one cache to send write requests for dirty data to the data fabric by transmitting a flush command signal to the at least one cache in response to the cache dirtiness of the at least one cache reaching the threshold, and push the write requests from the data fabric to the persistent memory.

In some aspects, the techniques described herein relate to an apparatus, wherein the controller is further configured to: command the at least one cache to flush to the persistent memory in response to a power loss event or a hazardous reset event.

In some aspects, the techniques described herein relate to an apparatus, further including: a core of a system-on-chip (SOC), a data fabric of the SOC that electrically couples the at least one cache to the persistent memory, and an external device coupled to the data fabric, wherein the controller is further configured to: command the at least one cache to flush to the persistent memory in response to a non-terminal event trigger initiated by the external device.

In some aspects, the techniques described herein relate to a method, including: selecting an operational point for generating a non-terminal flush event trigger in a data processing system based on system conditions of the data processing system, receiving, via a controller, the non-terminal flush event trigger in response to reaching the selected operational point, and commanding, via the controller, caches of the data processing system to flush dirty data to a persistent memory in response to receiving the non-terminal flush event trigger.

In some aspects, the techniques described herein relate to a method, wherein the selecting the operational point for generating the non-terminal flush event trigger in the data processing system based on the system conditions of the data processing system includes determining an available latency for flushing the dirty data from the caches to the persistent memory based on a power state of the data processing system and a thermal state of the data processing system.

In some aspects, the techniques described herein relate to a method, wherein the selected operational point corresponds to a cache dirtiness having a predicted flushing latency that is no greater than the available latency for flushing the dirty data from the caches to the persistent memory.

In some aspects, the techniques described herein relate to a method, wherein the commanding, via the controller, the caches of the data processing system to flush the dirty data to the persistent memory in response to the non-terminal flush event trigger includes: commanding, via the controller, a caching subsystem of a core of the data processing system to flush the dirty data held therein to a data fabric of the data processing system, commanding, via the controller, a cache of an external device coupled to the data fabric to flush the dirty data held therein to the data fabric, flushing the dirty data from the data fabric to the persistent memory, and verifying the flushing of the dirty data from the data fabric to the persistent memory by sharing, via the controller, a verification signal with the persistent memory.

In some aspects, the techniques described herein relate to a method, wherein the receiving the non-terminal flush event trigger occurs at a first time, and the method further includes: receiving, via the controller, a second non-terminal flush event trigger initiated by the external device at a second time, and commanding, via the controller, the caches of the data processing system to flush the dirty data to the persistent memory at the second time in response to receiving the second non-terminal flush event trigger.

In some aspects, the techniques described herein relate to a method, wherein the receiving the non-terminal flush event trigger occurs at a first time, and the method further includes: receiving a terminal flush event trigger at a second time, and commanding, via the controller, the caches of the data processing system to flush the dirty data to the persistent memory at the second time in response to receiving the terminal flush event trigger.

FIG. 1 is a block diagram of a non-limiting example data processing system 100. Examples of devices in which the data processing system 100 is implemented include, but are not limited to, servers, personal computers, laptops, desktops, game consoles, set top boxes, tablets, smartphones, mobile devices, virtual and/or augmented reality devices, wearables, medical devices, and other computing devices or systems. The data processing system 100 includes an example system-on-chip (SOC) 102. In at least one implementation, multiple devices are coupled to the SOC 102, examples of which are described below.

In the implementation depicted in FIG. 1, the SOC 102 includes a core 104, a data fabric 106 (e.g., an interconnect fabric), and a memory controller 108. In at least one variation, the core 104 is a processing unit (e.g., a central processing unit (CPU), a graphics processing unit (GPU), an accelerated processing unit (APU), or another type of processor) that reads and executes instructions (e.g., of a program), examples of which include to add, move, and branch data. Some implementations of the core 104 include multiple processor units (e.g., the core 104 is a multi-core processor). In various examples, each processing unit of the core 104 includes one or more dedicated internal caches and a shared cache. The caches associated with the core 104 are indicated as caching subsystem 110 in FIG. 1. In some variations, the dedicated internal caches include one or more of a first level 1 (L1) cache and a second level (L2) cache connected to the L1 cache, and a third level cache (L3) that is shared among the processors of the core 104 (e.g., all of the processors). Some implementations include a cache coherent memory as the third level cache, and the lowest-level internal caches of the core 104 have interfaces to the cache coherent memory.

In accordance with the described techniques, the caching subsystem 110 is coupled to the data fabric 106. The data fabric 106 is used to connect various data processor, memory, and input/output (I/O) components with various storage points for in-process write transactions via a fabric transport layer. The data fabric 106 includes a plurality of ports and components, non-limiting examples of which include I/O controllers, an I/O hub, a cache coherent interconnect for accelerators controller (ACM), and coherent target circuits (e.g., home nodes), interconnected through the fabric transport layer. For example, the coherent target circuits support various memory channels and enforce coherency and transaction ordering, such as during a run-time global push to persistence (also referred to herein as a "global flush"). As an example, the coherent target circuits track coherency and address collisions and support for outstanding transactions. I/O controllers of the data fabric 106 include various controllers (e.g., digital I/O controllers) and their physical layer interface circuits for protocols such as Peripheral Component Interconnect Express (PCIe) and the like. For example, the I/O controllers perform data link layer protocol functions associated with PCIe, Compute Express Link (CXL), or other protocol transactions.

The data fabric 106 further includes a fabric controller 112. The fabric controller 112 is a hardware controller that offloads application software, operating system, or system firmware from the task of recognizing and responding to runtime global push to persistence requests. In some examples, the fabric controller 112 is a microsequencer. Although the fabric controller 112 is shown within the data fabric 106, it should be understood that in other examples, the fabric controller 112 is located elsewhere and operatively coupled to the data fabric 106.

The data processing system 100 further includes a first device 114 and a second device 116 coupled to the data fabric 106, such as through an interconnect block and physical interface circuits. Each of the first device 114 and the second device 116 includes an internal cache. In particular, the first device 114 includes a cache 118, and the second device 116 includes a cache 120. A device local memory (LMEM) 122 is coupled to the first device 114. Examples of the first device 114 include a type 2 CXL device, such as an accelerator with memory or a parallel accelerated processor. Another example of the first device 114 is a graphics processing unit (GPU). Examples of the second device 116 include a type 1 CXL device, such as an accelerator or caching device. In one or more implementations, the first device 114 and the second device 116 have coherent memory access with the core 104 via the data fabric 106.

The memory controller 108 is coupled to a non-volatile memory 124, such as through a physical interface circuit. The memory controller 108 performs command buffering, re-ordering, and timing eligibility enforcement for utilization (e.g., efficient utilization) of a bus between the memory controller 108 and the non-volatile memory 124. Examples of the non-volatile memory 124 include flash memory and persistent random-access memory. Further examples of the non-volatile memory 124 include, but are not limited to, a single in-line memory module (SIMM) and a dual in-line memory module (DIMM). In some variations, the non-volatile memory 124 is a double data rate (DDR) and/or non-volatile dual-inline memory module with persistent storage ("NVDIMM-P") memory. In other variations, the non-volatile memory 124 is a type 3 CXL memory device (e.g., a CXL memory with no accelerator). The non-volatile memory 124 is configured in different ways in variations without departing from the spirit or scope of the described techniques.

In at least one implementation, the SOC 102 is coupled to other SOCs that have their own attached storage that is visible to each processor in a memory map. Therefore, in variations, the SOC 102 includes a global memory interface controller for inter-chip communication to the other SOCs. Additionally or alternatively, one or more external coherent memory devices are coupled to the SOC 102. In some such examples, the SOC 102 includes a coherent network layer interface that routes traffic to the external coherent memory device(s). Non-limiting examples of external coherent memory devices include type 3 CXL devices, such as memory expanders/buffers.

The data interface and distributed memory hierarchy of SOCs like the SOC 102 can be complex, layered, and distributed. This complex interconnect fabric presents challenges for supporting a runtime global push to persistence that are addressed by the techniques described herein.

Figure 2:
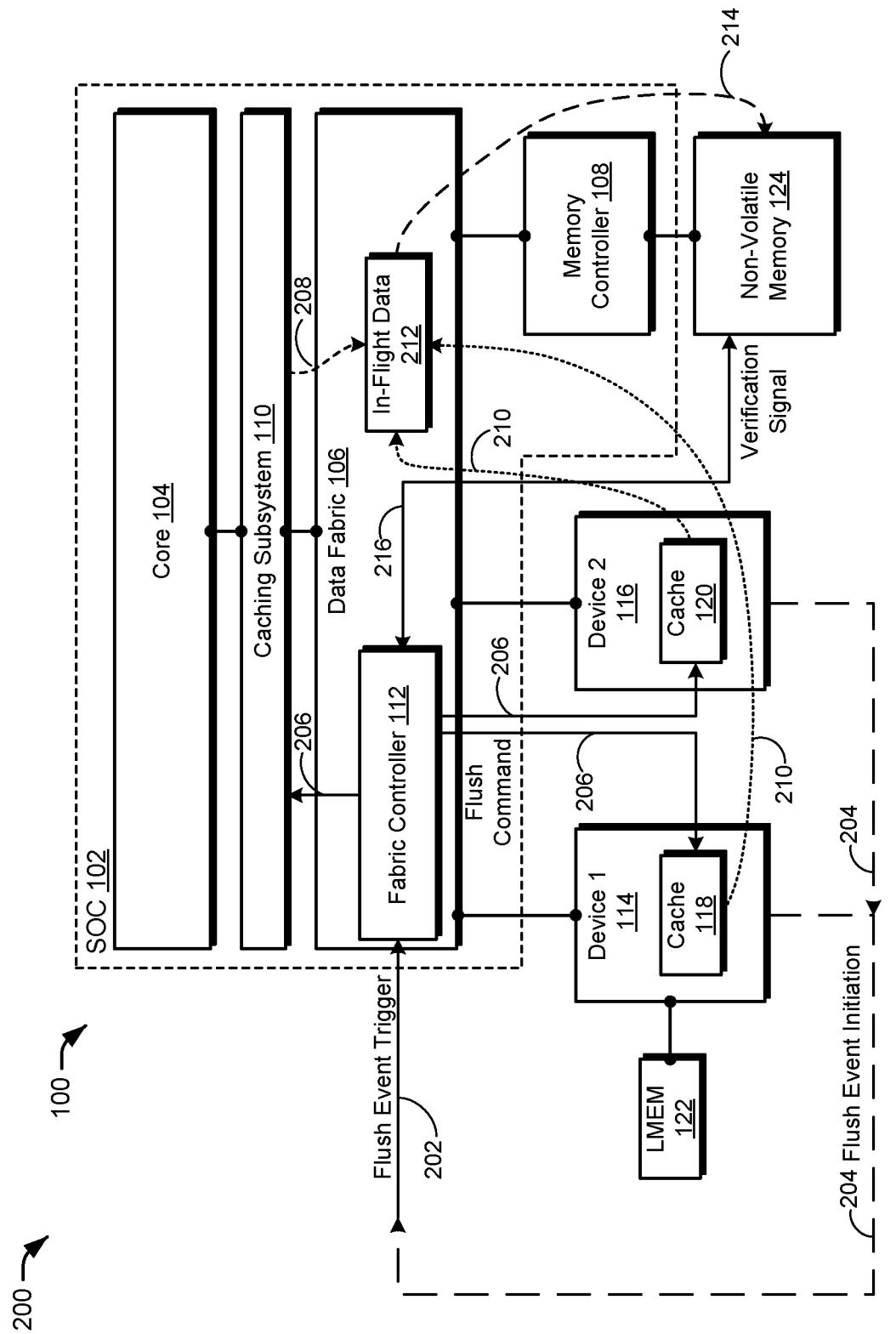
FIG. 2 depicts a non-limiting example of a data processing system performing a runtime global push to persistence.

Referring now to FIG. 2, a non-limiting example 200 of the data processing system 100 performing a runtime global push to persistence is depicted in block diagram form. In one or more implementations, the fabric controller 112 initially receives a flush event trigger 202. The flush event trigger 202 is one of a terminal event trigger (also termed "terminal flush event trigger") or a non-terminal event trigger (also termed "non-terminal flush event trigger"). The terminal event trigger is received in response to an event like a hazardous reset request, an imminent power failure, a thermal overload or "trip" condition, or any other condition that indicates the need to imminently terminate the operation of the data processing system 100. The non-terminal event trigger is received in response to a non-terminal event like encountering a certain address, detecting low processor utilization, encountering a certain time of day, detecting a certain elapsed time since a previous runtime global push to persistence operation, or detecting a certain level of "dirtiness" in one or more caches, as will be elaborated herein. The non-terminal event trigger allows the system to push highly sensitive data like journal logs, shadow paging, etc. to external persistent memory on a periodic basis. In one or more examples, a non-terminal event trigger is initiated by one of the first device 114 or the second device 116, which is indicated in FIG. 2 as a flush event initiation 204.

In response to receiving the flush event trigger 202, the fabric controller 112 commands caches and buffers coupled to the data fabric 106 to flush pending memory transactions to persistent memory (e.g., the non-volatile memory 124) via a flush command 206. In one or more implementations, all of the caches are flushed to the data fabric 106 (e.g., each cache that is attached to the data fabric 106 is flushed to the data fabric 106). FIG. 2 shows the flush command 206 being transmitted from the fabric controller 112 to the caching subsystem 110 of the core 104, the cache 118 of the first device 114, and the cache 120 of the second device 116. As such, the fabric controller 112 transmits the flush command 206 to one or more devices having a cache within the coherent domain, even when the flush event trigger 202 is initiated by a single device (e.g., via the flush event initiation 204).

In some examples, the flush command 206 represents firmware running on the fabric controller 112 that examines the status of each line in each cache in the SOC 102 and selectively causes dirty cache lines to be written to memory. Additionally or alternatively, the flush command 206 is an explicit hardware signal sent to each of the caches that causes them to automatically flush dirty data by examining cache lines and writing cache lines that contain dirty data to main memory. A per cache way "dirty" indication can speed up the process of cache flushing. Those cache ways in which the "dirty" indication is cleared (or not present) are skipped by the cache flush process. As such, the cache flush process is performed via hardware, firmware, or a combination of hardware and firmware.

In response to receiving the flush command 206, the caching subsystem 110 flushes the dirty data held therein to the data fabric 106. For example, the caching subsystem 110 sends write requests with the dirty data to the data fabric 106, indicated by a data flow path 208. Similarly, the dirty data from the cache 118 and the cache 120 are flushed to the data fabric 106, indicated by data flow paths 210, in response to receiving the flush command 206 from the fabric controller 112. These write requests flow through the data fabric 106 as in-flight data 212. In at least one implementation, the in-flight data 212 include modified data that have been sent for persistence and have not yet been written to memory. By way of example, the in-flight data 212 include pending write requests from the caching subsystem 110, the cache 118, and/or the cache 120. In some examples, a probe filter or cache state tracker mechanism indicates that particular cache ways or entries do not include modified data. In some such examples, the cache ways or entries without modified data are skipped during flushing, thus reducing total flush latency.

The fabric controller 112 causes the in-flight data 212 present within the data fabric 106 and associated interface circuits to complete and drain through a buffer point in the data fabric 106 to external persistent memory, which is the non-volatile memory 124 in the example 200. In at least one implementation, the fabric transport layer of the data fabric 106 has a buffer that stores read and write commands to the non-volatile memory 124. In response to the flush event trigger 202, the fabric controller 112 causes the fabric transport layer to push writes out to the non-volatile memory 124, as indicated by a data flow path 214. In some examples, the fabric controller 112 further allows passage of any reads. In another example, the memory controller 108 stores dynamic random access memory (DRAM) writes in its internal command queue. In response to the flush event trigger 202, the fabric controller 112 causes the memory controller 108 to send writes to the non-volatile memory 124 without acting on pending reads while continuing to observe efficiency protocols such as a preference for combining writes to open pages over writes to closed pages. Thus, the "in-flight" memory operations in data communication fabrics, buffers, memory controllers, and the like are completed as part of runtime global push to persistence to achieve data durability of the system.

In one or more implementations, the fabric controller 112 prioritizes speed over lowering power consumption in response to a terminal event trigger and prioritizes lowering power consumption over speed in response to a non-terminal event trigger. For example, in response to a terminal event trigger, the fabric controller 112 stalls the operation of the core 104 and other data processors, causes the caching subsystem 110 and the caches 118 and 120 to send dirty data to the data fabric 106, and then commands caches and buffers in the data fabric 106 to flush pending memory transactions to the non-volatile memory 124. In contrast, in response to a non-terminal event trigger, the fabric controller 112 causes the caching subsystem 110 and the caches 118 and 120 to send dirty data to the data fabric 106 without stalling the core 104, allows the data fabric 106 to push out the data over time (e.g., without an explicit command and/or according to a schedule), and resumes operation without a reset.

The fabric controller 112 shares a verification signal 216 with the non-volatile memory 124 that enables the fabric controller 112 to verify that the data has been properly flushed from the data fabric 106 to the non-volatile memory 124. In some examples, the verification signal 216 is a handshake signal. The global push to persistence is completed in response to the non-volatile memory 124 returning the verification signal 216 to the fabric controller 112, at least in some examples.

In response to a persistency loss, which may be identified by setting a "loss" flag in the non-volatile memory 124, for example, application software restarts at a last known-to-be-trusted state. That is, the application software performs a checkpoint rollback and replay. For example, in some implementations, a "persistence loss" error is logged, and on boot-up, system basic input-output system (BIOS) firmware identifies the persistence loss and reports through an advanced configuration and power interface (ACPI) "NFIT" object. In some implementations, "persistence loss" is captured in a log so that an operating system can learn directly about the event.

As mentioned above, some non-terminal event triggers are initiated in response to detecting a certain level of dirtiness in one or more caches. The level of dirtiness that results in the flush event trigger 202 varies based on operating conditions because different temperature and power states, for example, affect a latency of performing the runtime global push to persistence. Furthermore, the latency and energy used in performing the runtime global push to persistence vary based on the cache dirtiness.

Figure 3:
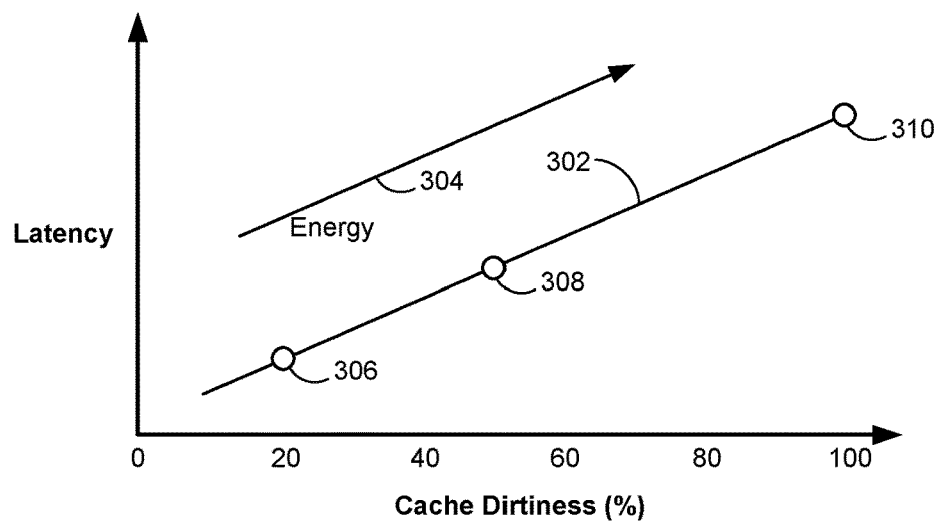
FIG. 3 shows an example graph relating cache dirtiness to a latency for performing a runtime global push to persistence.

As shown in FIG. 3, a non-limiting example graph 300 relates cache dirtiness (horizontal axis) with the latency (vertical axis) of performing the global flush (e.g., the flushing latency). The cache dirtiness is shown as a percentage. For example, 100% cache dirtiness refers to all of the cache ways (e.g., of one or a combination of the caching subsystem 110, the cache 118, and the cache 120) having modified data and being indicated as "dirty," and 0% cache dirtiness refers to none of the cache ways being indicated as "dirty." The latency increases along the vertical axis from the bottom to the top (e.g., in the direction of the axis arrow). The latency is measured in units of time, such as milliseconds.

As shown by a plot 302, as the cache dirtiness increases, the latency for performing the global flush increases. For example, there is more dirty data to transport from the cache to the data fabric 106 and to the non-volatile memory 124. Further, as the cache dirtiness increases, an energy consumed in performing the global flush also increases, as shown by an arrow 304. By way of comparison, a first data point 306 on the plot 302 corresponds to a first cache dirtiness (e.g., approximately 20% dirtiness), a second data point 308 on the plot 302 corresponds to a second cache dirtiness (e.g., approximately 50% dirtiness) that is greater than the first cache dirtiness, and a third data point 310 on the plot 302 corresponds to a third cache dirtiness (e.g., approximately 100% dirtiness) that is greater than the second cache dirtiness. The latency and energy values for executing the global flush at the first cache dirtiness (the first data point 306) are lower than those for performing the global flush at the second cache dirtiness (the second data point 308) and the third cache dirtiness (the third data point 310). Furthermore, the latency and energy values for executing the global flush at the third cache dirtiness are greater than those for performing the global flush at the second cache dirtiness.

The relationship shown in the non-limiting example graph 300 enables a prediction to be made regarding how long it will take to perform the global flush based on the cache dirtiness. Therefore, in order to ensure that there is sufficient time available to write all of the modified data to memory in a terminal event, the cache dirtiness may be maintained below a cache dirtiness threshold above which an available latency is exceeded. As will be elaborated below with respect to FIG. 5, a non-terminal event trigger is generated in response to the cache dirtiness reaching the cache dirtiness threshold so that the modified data in the cache is pre-emptively flushed to persistence, thus avoiding data loss due to having insufficient time to write all of the modified data to persistent memory during a terminal event.

Figure 4:
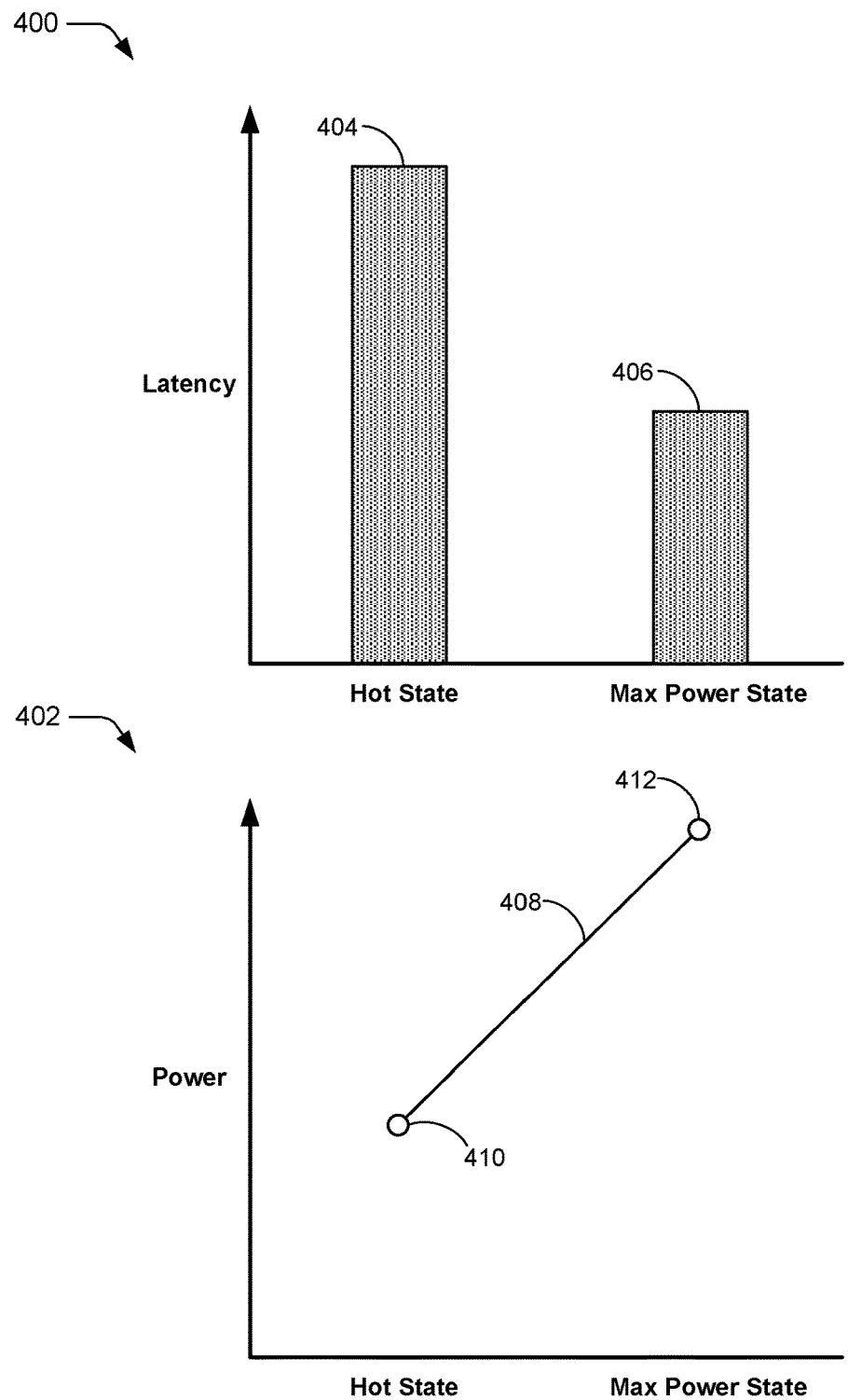
FIG. 4 shows example graphs demonstrating latency and power values for performing a runtime global push to persistence with respect to different operating states of a data processing system.

As mentioned above, different power and temperature states affect the flushing latency, and thus, the cache dirtiness threshold varies based on the power and temperature conditions of the system. FIG. 4 shows a first non-limiting example graph 400 demonstrating latency values for performing a runtime global push to persistence with respect to different operating states of a data processing system (e.g., the data processing system 100) and a second non-limiting example graph 402 demonstrating power values for performing the runtime global push to persistence with respect to the different operating states. The vertical axis of the first graph 400 represents the latency, and the vertical axis of the second graph 402 represents the power. The latency and the power increase along the corresponding vertical axis from bottom to top (e.g., in the direction of the axis arrows). For each of the first graph 400 and the second graph 402, the horizontal axis indicates the operating state of a processor of the data processing system (e.g., the core 104). In the non-limiting examples of the first graph 400 and the second graph 402, the operating states include a hot state and a maximum (e.g., "max") power state. The hot state refers to an elevated temperature state of the processor. In at least one example, the hot state is determined based on an output of a thermal sensor and corresponds to a measured temperature that is above a threshold temperature. By way of example, the threshold temperature refers to a pre-determined, non-zero temperature value that may occur, for example, when the processor is under increased load (e.g., 75-100% of its load capacity). Although two states are shown in FIG. 4, it is to be understood that other states are possible that have other associated power and latency values for executing the global flush.

The latency of the two different operating states is represented in bar graph form on the first graph 400, including a first bar 404 indicating the latency for the hot state and a second bar 406 indicating the latency for the maximum power state. The power usage of the two states is represented by a line graph 408 on the second graph 402. A first data point 410 of the line graph 408 represents the power for the hot state, whereas a second data point 412 of the line graph 408 represents the power for the maximum power state. As demonstrated in the non-limiting examples of the first graph 400 and the second graph 402, the hot state has a higher flushing latency (the first bar 404) and a lower power usage (the first data point 410) than the maximum power state when pushing a same amount of data (e.g., a same cache dirtiness) to persistency. As such, a runtime decision may be made regarding whether to operate in the global persistent flush mode or the basic persistent flush mode due to the different power requirements, thermal requirements, and available latency based on a current operating state of the data processing system.

Figure 5:
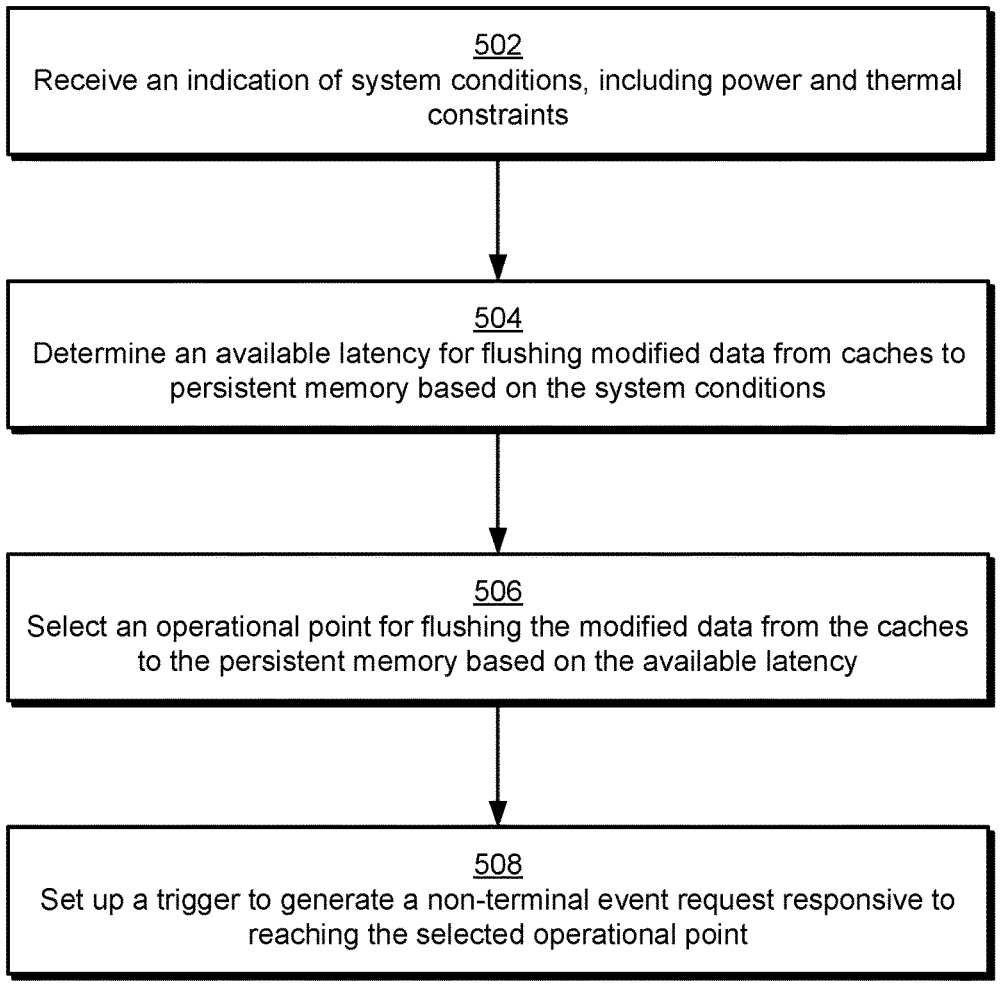
FIG. 5 depicts a procedure in an example implementation of determining an operational point for pre-emptively generating a non-terminal event trigger for a global push to persistence.

FIG. 5 depicts a procedure 500 in an example implementation of determining an operational point for generating a non-terminal event trigger in order to pre-emptively initiate a global push to persistence in a data processing system. In example implementations, the data processing system is a heterogenous system including a plurality of devices coupled to a data fabric, and each of the plurality of devices has one or more associated caches.

An indication of system conditions, including power and thermal constraints, is received (block 502). By way of example, the power and thermal constraints are measurable values that are provided to a controller (e.g., the fabric controller 112). In some examples, the power and thermal constraints are associated with a current operating state of the data processing system (e.g., the data processing system 100), such as a pre-defined "hot state" or a pre-defined "maximum power state".

An available latency for flushing modified data from caches to persistent memory is determined based on the system conditions (block 504). By way of example, the controller receives the indication of the system conditions and, using that data, computes or estimates the available latency for executing a global push to persistence. In example implementations, the controller references one or more look-up tables and/or graphs that relate the system conditions to the available latency for performing the global push to persistence, such as the non-limiting example graph 400 shown in FIG. 4, to determine the available latency. Additionally or alternatively, the controller inputs the system conditions into a model or formula, which outputs a prediction of the available latency.

An operational point for flushing the modified data from the caches to persistent memory is selected based on the available latency (block 506). By way of example, the operational point corresponds to a cache dirtiness having a predicted flushing latency that is no greater than the available latency. In one example, the operational point refers to a cache dirtiness threshold. In some such examples, cache dirtiness percentages above the cache dirtiness threshold have predicted flushing latencies that exceed the available latency. In some examples, the cache dirtiness threshold is decreased a pre-determined amount (or percentage) from the cache dirtiness corresponding to the available latency in order to further ensure that the selected operational point has a flushing latency that is less than the available latency. As such, the cache dirtiness threshold varies based on the operating conditions because the operating conditions affect the available latency.

In example implementations of selecting the operational point, the controller references a look-up table or graph that relates operational points (e.g., cache dirtiness percentages) to predicted flushing latencies, such as the non-limiting example graph 300 shown in FIG. 3. In some variations, the controller selects (e.g., sets) the operational point to balance energy consumption with effectively maintaining the flushing latency below the available latency due to a system-level tradeoff between power and latency. For example, selecting an operational point at a very low cache dirtiness may result in more frequently triggering the global push to persistence, which increases power consumption. Conversely, selecting an operational point at a cache dirtiness that is at or just within the available latency provides little time buffer in the case of a terminal event. Therefore, in various implementations, the selected operational point (e.g., the cache dirtiness threshold) has a predicted flushing latency that is less than the available latency by a pre-determined margin.

A trigger is set up to generate a non-terminal event request responsive to reaching the selected operational point (block 508). By way of example, the controller generates the non-terminal event request responsive to the dirtiness of the cache(s) reaching the cache dirtiness threshold.

Figure 6:
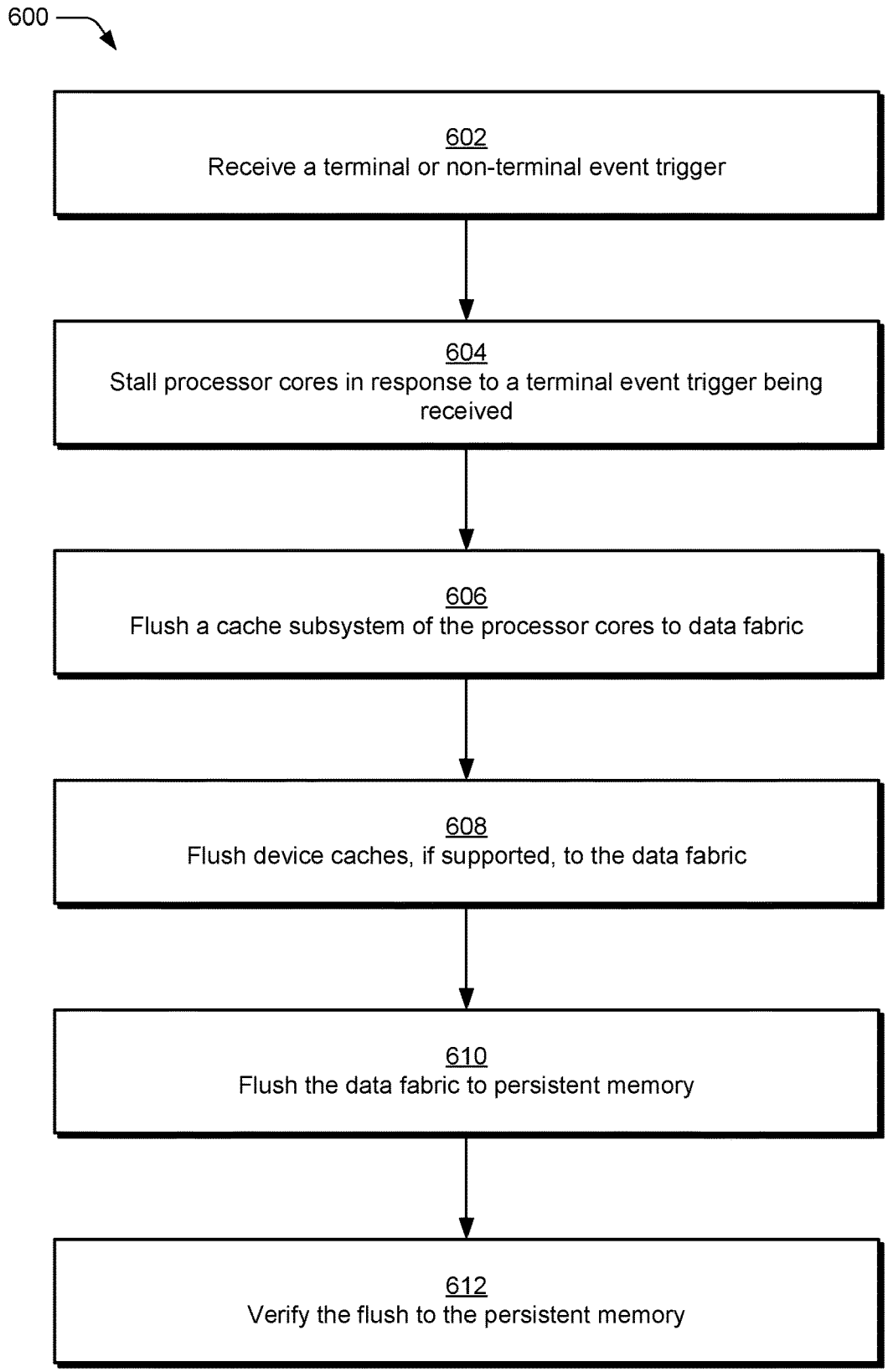
FIG. 6 depicts a procedure in an example implementation of performing a runtime global push to persistence in a SOC.

FIG. 6 depicts a procedure 600 in an example implementation of performing a runtime global push to persistence in a data processing system (e.g., the data processing system 100). The procedure 600 is useful in a SOC (e.g., the SOC 102) according to some implementations.

A terminal or non-terminal event trigger is received (block 602). In accordance with the principles discussed herein, the terminal or non-terminal event trigger is received by a controller (e.g., the fabric controller 112). In some examples, the controller also generates the non-terminal event trigger, such as in response to reaching an operational point that is selected to pre-emptively flush the device caches to reduce a risk of data loss during a terminal event. In other examples, the non-terminal event trigger is initiated by software associated with devices of the data processing system (e.g., the flush event initiation 204). By way of example, the fabric controller 112 receives the terminal or non-terminal event trigger as a flush event trigger 202, which initiates the runtime global push to persistence process.

Processor cores are stalled in response to a terminal event trigger being received (block 604). As such, if the flush event trigger 202 is a terminal event trigger, the processor cores (e.g., the core 104) are stalled. By way of example, if a multi-core is present, each processor of the multi-core is stalled. Alternatively, if the flush event trigger 202 is a non-terminal event trigger, the processor cores are not stalled, and block 604 is omitted (e.g., skipped).

A cache subsystem of the processor cores is flushed to data fabric (block 606). In accordance with the principles discussed herein, dirty data is flushed from the cache subsystem (e.g., the caching subsystem 110) by sending write requests for the dirty data to the data fabric (e.g., the data fabric 106). In one or more implementations, these requests flow through a fabric transport layer of the data fabric and are temporarily stored in one or more coherent target circuits according to corresponding memory mapping locations. For example, the write requests are stored in a first coherent target circuit when the memory is mapped to a first persistent memory or a second coherent target circuit when the memory is mapped to a second persistent memory. In a non-limiting example, the first persistent memory is NVDIMM-P, and the second persistent memory is a CXL memory device (e.g., a CXL type 3 memory device with no accelerator).

Device caches, if supported, are flushed to the data fabric (block 608). By way of example, dirty data is flushed from the cache(s) of external device(s) (e.g., the cache 118 of the first device 114 and the cache 120 of the second device 116) to the data fabric. This action includes reading the dirty data from the external devices into the on-chip data fabric. Similar to that described above, the dirty data from the device caches are sent through the data fabric. In variations, the write requests for the dirty data are sent to a selected coherent target circuit based on the memory mapping location (e.g., the first coherent target circuit or the second coherent target circuit described above).

The data fabric is flushed to persistent memory (block 610). By way of example, the runtime global push to persistence process flushes pending write requests in the data fabric by sending the write requests to the persistent memory (e.g., the non-volatile memory 124). In variations, the write requests are sent to more than one persistent memory location based on the memory mapping location.

The flush to the persistent memory is verified (block 612). By way of example, the controller shares a verification signal with the persistent memory (e.g., the verification signal 216). In some examples, the verification signal is a handshake signal with the persistent memory, such as according to CXL protocols. Other verification signals are also possible where the persistent memory acknowledges to the controller that the global push to persistence is completed and the dirty data has been properly written to the persistent memory.

According to the techniques described herein, the procedure 600 is repeated for each flush event trigger. By way of example, the procedure 600 is executed at a first time in response to a non-terminal event trigger that is generated responsive to reaching the selected operational point at the first time, at a second time (which occurs before or after the first time) in response to a non-terminal event trigger initiated by an external device (e.g., the first device 114 or the second device 116) at the second time, and at a third time (which occurs before or after one or both of the first and second times) in response to a terminal event trigger. As such, the procedure 600 provides a method for reliably performing the runtime global push to persistence in response to flush event triggers initiated by a variety of different conditions.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the SOC 102 having the core 104, the caching subsystem 110, the data fabric 106, and the memory controller 108; as well as the first device 114, the second device 116, and the non-volatile memory 124 external to the SOC 102 and coupled to the data fabric 106) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In the preceding description, the use of the same reference numerals in different drawings indicates similar or identical items. Unless otherwise noted, the word "coupled" and its associated verb forms include both direct connection and indirect electrical connection. Unless explicitly stated otherwise, any description of direct connection implies alternate examples using suitable forms of indirect electrical connection as well. Example wired connections include, but are not limited to, buses (e.g., a data bus), interconnects, traces, and planes.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
   a persistent memory in electronic communication with at least one cache; and
   a controller configured to:
   command the at least one cache to flush dirty data to the persistent memory in response to a dirtiness of the at least one cache reaching a cache dirtiness threshold.

2. The system of claim 1, wherein to command the at least one cache to flush the dirty data to the persistent memory in response to the dirtiness of the at least one cache reaching the cache dirtiness threshold, the controller is further configured to:
   determine an available latency for flushing the dirty data of the at least one cache to the persistent memory based on operating conditions of the system; and
   set the cache dirtiness threshold to be a cache dirtiness having a predicted flushing latency that is no greater than the available latency.

3. The system of claim 2, wherein the system further comprises a processor, and wherein the operating conditions include a thermal state of the processor and a power state of the processor.

4. The system of claim 3, wherein the processor is included in a system-on-chip (SOC) and includes a first cache of the at least one cache, and wherein the persistent memory is in electronic communication with the first cache through a data fabric.

5. The system of claim 4, further comprising an external device coupled to the data fabric, the external device having a second cache of the at least one cache.

6. The system of claim 5, wherein the external device is one of an accelerator, a parallel accelerated processor, an accelerator with memory, a caching device, and a graphics processing unit, and wherein the controller is further configured to:
   command the at least one cache to flush dirty data to the persistent memory in response to receiving a flush event initiation from the external device.

7. The system of claim 1, wherein the cache dirtiness threshold varies based on operating conditions of the system.

8. The system of claim 1, wherein the persistent memory is in electronic communication with the at least one cache through a data fabric, and wherein to command the at least one cache to flush the dirty data to the persistent memory in response to the dirtiness of the at least one cache reaching the cache dirtiness threshold, the controller is further configured to:
  transmit a flush command signal to the at least one cache that causes the at least one cache to send write requests for cache lines that contain the dirty data to the data fabric, the write requests comprising in-flight data in the data fabric; and
  push the in-flight data from the data fabric to the persistent memory.

9. An apparatus, comprising:
a data processing system having at least one cache;
a persistent memory; and
a controller configured to:
  select a threshold for flushing the at least one cache to the persistent memory based on an available latency for flushing the at least one cache; and
  command the at least one cache to flush to the persistent memory in response to reaching the threshold.

10. The apparatus of claim 9, wherein to select the threshold for flushing the at least one cache to the persistent memory based on the available latency, the controller is further configured to:
  determine the available latency based on conditions of the data processing system; and
  set the threshold as a cache dirtiness having a predicted latency that is no greater than the available latency.

11. The apparatus of claim 10, wherein the conditions of the data processing system include thermal and power operating conditions of the data processing system.

12. The apparatus of claim 10, further comprising a data fabric electrically coupling the at least one cache to the persistent memory, and wherein to command the at least one cache to flush to the persistent memory in response to reaching the threshold, the controller is further configured to:
  command the at least one cache to send write requests for dirty data to the data fabric by transmitting a flush command signal to the at least one cache in response to the cache dirtiness of the at least one cache reaching the threshold; and
  push the write requests from the data fabric to the persistent memory.

13. The apparatus of claim 9, wherein the controller is further configured to:
  command the at least one cache to flush to the persistent memory in response to a power loss event or a hazardous reset event.

14. The apparatus of claim 9, further comprising:
a core of a system-on-chip (SOC);
a data fabric of the SOC that electrically couples the at least one cache to the persistent memory; and
an external device coupled to the data fabric;
wherein the controller is further configured to:
  command the at least one cache to flush to the persistent memory in response to a non-terminal event trigger initiated by the external device.

15. A method, comprising:
selecting an operational point for generating a non-terminal flush event trigger in a data processing system based on system conditions of the data processing system;
receiving, via a controller, the non-terminal flush event trigger in response to reaching the selected operational point; and
commanding, via the controller, caches of the data processing system to flush dirty data to a persistent memory in response to receiving the non-terminal flush event trigger.

16. The method of claim 15, wherein the selecting the operational point for generating the non-terminal flush event trigger in the data processing system based on the system conditions of the data processing system comprises determining an available latency for flushing the dirty data from the caches to the persistent memory based on a power state of the data processing system and a thermal state of the data processing system.

17. The method of claim 16, wherein the selected operational point corresponds to a cache dirtiness having a predicted flushing latency that is no greater than the available latency for flushing the dirty data from the caches to the persistent memory.

18. The method of claim 15, wherein the commanding, via the controller, the caches of the data processing system to flush the dirty data to the persistent memory in response to the non-terminal flush event trigger comprises:
  commanding, via the controller, a caching subsystem of a core of the data processing system to flush the dirty data held therein to a data fabric of the data processing system;
  commanding, via the controller, a cache of an external device coupled to the data fabric to flush the dirty data held therein to the data fabric;
  flushing the dirty data from the data fabric to the persistent memory; and
  verifying the flushing of the dirty data from the data fabric to the persistent memory by sharing, via the controller, a verification signal with the persistent memory.

19. The method of claim 18, wherein the receiving the non-terminal flush event trigger occurs at a first time, and the method further comprises:
  receiving, via the controller, a second non-terminal flush event trigger initiated by the external device at a second time; and
  commanding, via the controller, the caches of the data processing system to flush the dirty data to the persistent memory at the second time in response to receiving the second non-terminal flush event trigger.

20. The method of claim 18, wherein the receiving the non-terminal flush event trigger occurs at a first time, and the method further comprises:
  receiving a terminal flush event trigger at a second time; and
  commanding, via the controller, the caches of the data processing system to flush the dirty data to the persistent memory at the second time in response to receiving the terminal flush event trigger.

* * * * *